United States Patent [19]

Lin

[11] Patent Number: 4,747,022

[45] Date of Patent: May 24, 1988

[54] STRUCTURE OF OPTICAL FIBER DECORATING LAMP

[76] Inventor: Chuen-Hwa Lin, Fl. 2-5, No. 202, Nan-King E. Rd., Sec. 5, Taipei, Taiwan

[21] Appl. No.: 842,815

[22] Filed: Mar. 24, 1986

[51] Int. Cl.$^4$ .............................................. F21V 8/00
[52] U.S. Cl. ...................................... 362/32; 362/806
[58] Field of Search ................. 362/32, 226, 277, 806, 362/811; 403/71, 289

[56] References Cited

U.S. PATENT DOCUMENTS

| | | | |
|---|---|---|---|
| 3,354,302 | 11/1967 | Greasley | 403/289 X |
| 3,714,418 | 1/1973 | Stephans | 362/277 |
| 3,766,376 | 10/1973 | Sadacca et al. | 362/32 X |
| 3,772,511 | 11/1973 | Marban | 362/811 X |
| 4,025,779 | 5/1977 | Ahroni | 362/32 |
| 4,034,215 | 7/1977 | Hashimoto | 362/32 |

FOREIGN PATENT DOCUMENTS 2611622  9/1977  Fed. Rep. of Germany ........ 403/71

Primary Examiner—Samuel Scott
Assistant Examiner—Allen J. Flanigan
Attorney, Agent, or Firm—Asian Pacific International Patent and Trademark Office

[57] ABSTRACT

Optical fiber decorating lamp characterized by a bundle seat with a seat and a gear made by injection forming so that it can be installed at a partition board without any clip ring or the necessity of gluing the gear. The partition board holds the optical fiber decorating lamp in a small space, and all inner parts and components are hung on it without the height limitation of a support base.

4 Claims, 7 Drawing Sheets

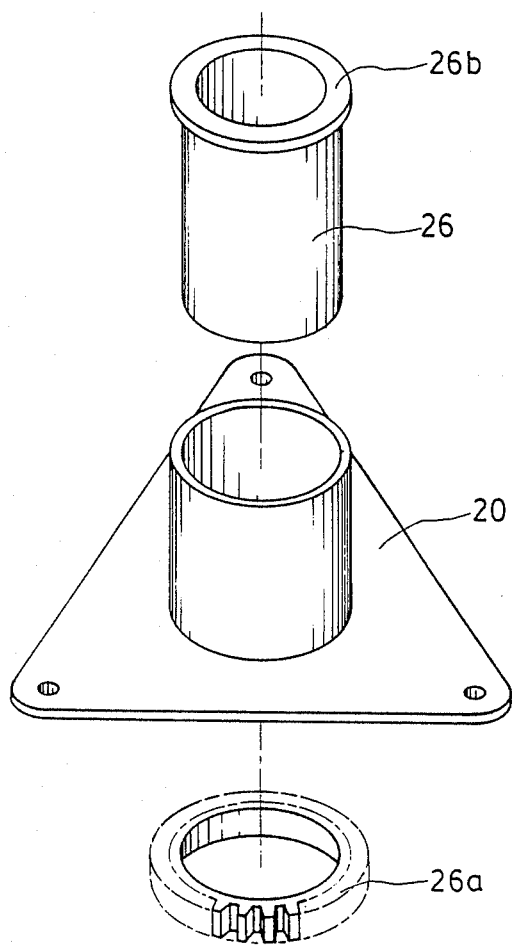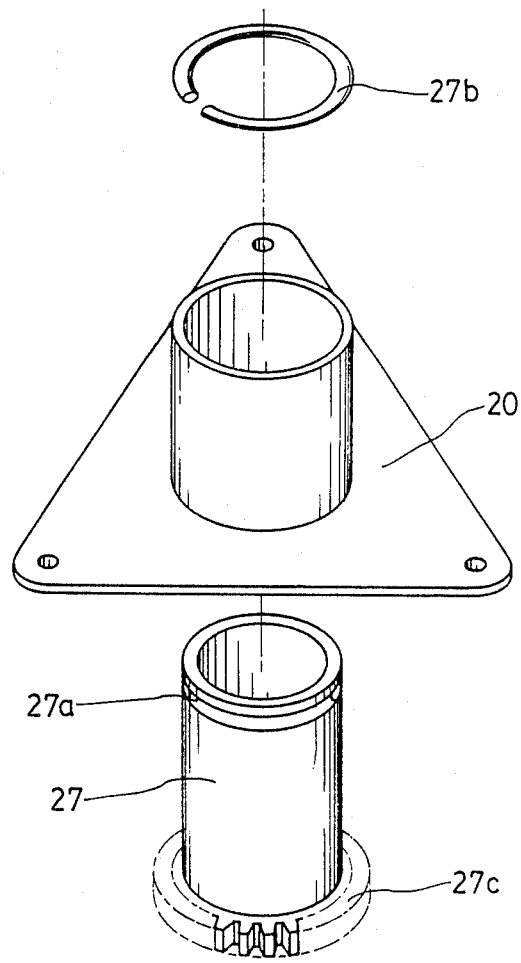
FIG. 3-A
FIG. 3-B

STRUCTURE OF OPTICAL FIBER DECORATING LAMP

BACKGROUND OF THE INVENTION

Optical fiber decorating lamps have been an excellent night atmosphere decoration for their novel, beautiful, wonderful and variable effects.

Generally, optical fibers are made into the form of flowers and leaves by connecting, cutting and coloring them to make an optical fiber decorating lamp which, when lit from its bottom, the profile of the leaves and flowers appear like stars in the sky. If a rotatable color filter driven by a motor is installed between the end of the optical fibers and light source, light of different colors will sparkle continuously or intermittently along the leaves and flowers profile.

However, the internal structure of the conventional optical fiber decorating lamp is complicated. Please refer to FIG. 2. The partition board (20) is independent from the support disc (21). The lamp socket partition board (22) and the connecting posts (23), (23') are installed separately too. Therefore, assembly of these components is difficult and wastes time. It is not economic. Generally, there are a few small heat dissipation holes (21b), (21b') around the bundle hole (21a) of the support disc (21) and just some hot air can dissipate through them. No cool air is able to enter them. Therefore, cooling is poor.

Generally, the conventional optical fiber decorating lamp has a smooth parabolic reflecting mirror (25) behind its light source (24) for concentrating light beams toward ends of the optical fibers. However, such a structure substantially always causes burning, bending, distortion and even melting of the ends of optical fibers and severely affects the light transmission efficiency of the optical fibers. The lighting effect of the optical fiber decorating lamp is thus impaired.

In order to preclude dislocation of the bundle seat (26), the conventional optical fiber decorating lamp has its bundle seat attached to a gear (26a). Assembly of this is difficult, and its reliability is low. Normally, two techniques are used: The bundle seat (26) is made with a stop ring (26b) at the end to attach to the gear (26a) after installing from the upper side of the partition board (20) by heat treatment so that the bundle seat (26) is fixed to the partition board (20), please refer to FIG. 3-A. Alternatively, the gear (27c) is formed as an integral part of the bundle seat (27) to stay within a clip ring (27b) on circular groove (27a) by inserting it from the upper side to the lower side of the partition board (20), please refer to FIG. 3-B. These procedures are complicated, and the reliability is low too. Neither of them are desirable.

SUMMARY OF THE INVENTION

The present invention provides an improved optical fiber decorating lamp structure which is a breakthrough against the limitations and defects of the conventional optical fiber decorating lamp structure, and eliminates complicated assembly procedures, high production cost, etc. of the conventional structure. It provides an optical fiber decorating lamp, of which the heat can be scattered quickly and the repair can be performed easily.

The present invention is mainly characterized by an improved bundle seat structure which includes a gear and is formed by injection. The bundle seat can be easily fixed to a partition board and without any clip ring or adhesion between the gear and the bundle seat. It will not dislocate, its assembly is easy, and its reliability is high.

The present invention is further characterized by an improved partition board which has the function of a support disc as used in the conventional structure, a bundle seat partition board, and the respective connecting posts. It occupies little space; it can be assembled easily, the internal parts of the optical fiber decorating lamp can be hund on it without being limited by the height of a support block, and the requirement of precise height of attendant connecting posts.

The present invention is further characterized by a structure which permits good cooling effect, allows air convection between the atmosphere and the interior space of the block, prevents burning, bending, distortion of the ends of optical fibers after prolonged exposure to a light source, the transmission of light of a given input light intensity at every part of the optical fibers being even.

BRIEF DESCRIPTION OF THE DRAWINGS

FIG. 3-A is a schematic illustration of the assembly of a bundle seat for the conventional optical fiber decorating lamp.

FIG. 3-B is a schematic illustration of another assembly of a bundle seat for the conventional optical fiber decorating lamp.

DETAILED DESCRIPTION

Figure 1:
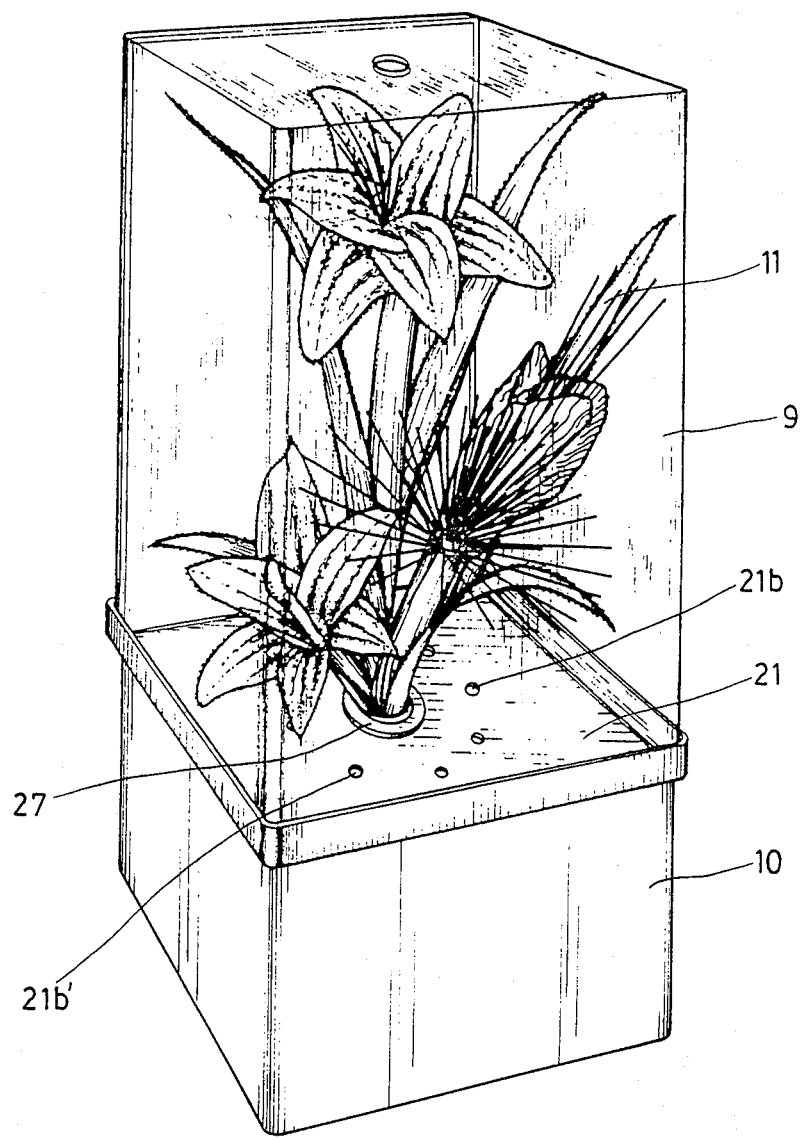
FIG. 1 illustrates a conventional optical fiber decorating lamp.
Figure 2:
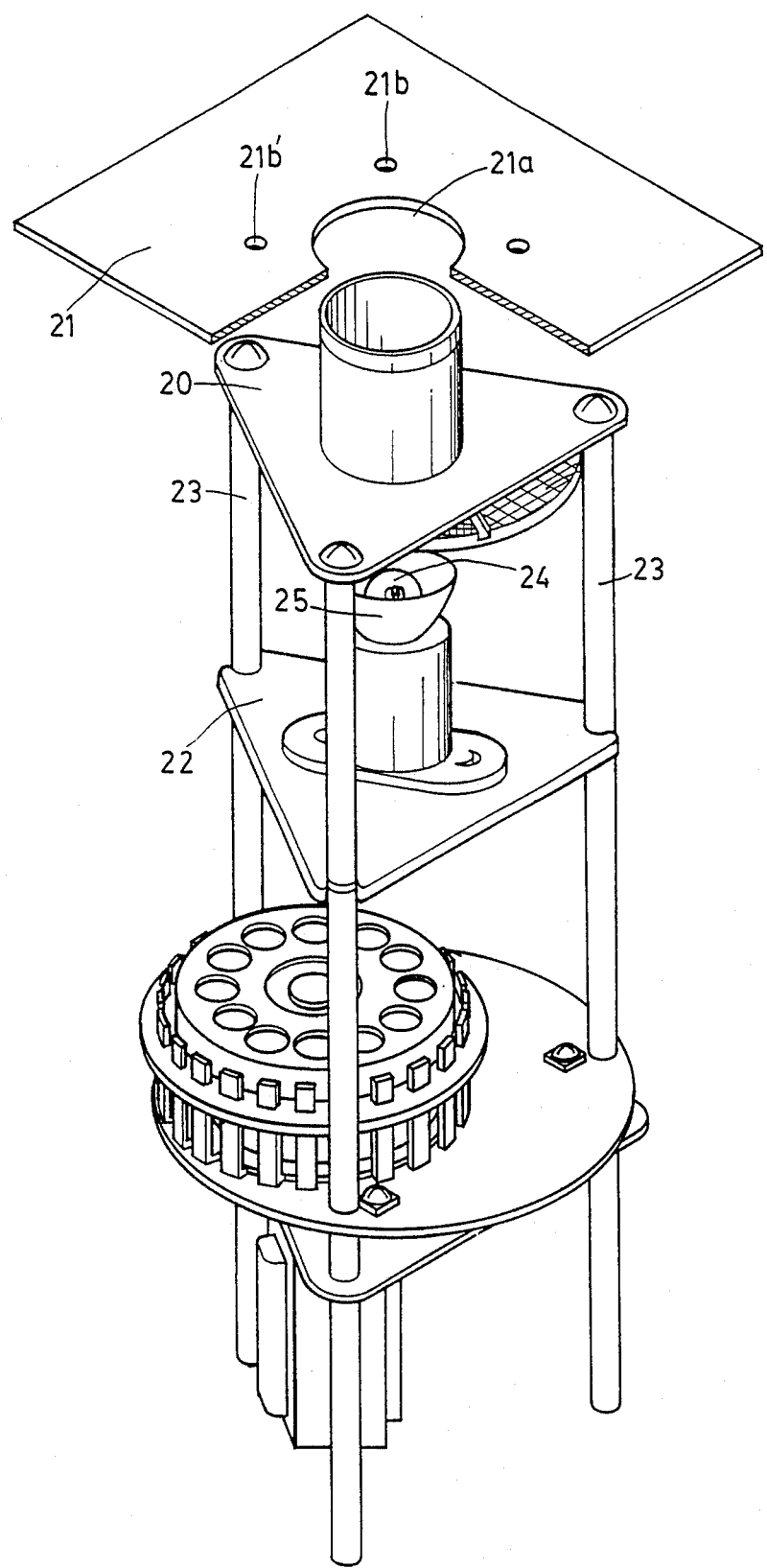
FIG. 2 is a perspective view of the internal structure of an optical fiber decorating lamp according to the prior art.
Figure 4:
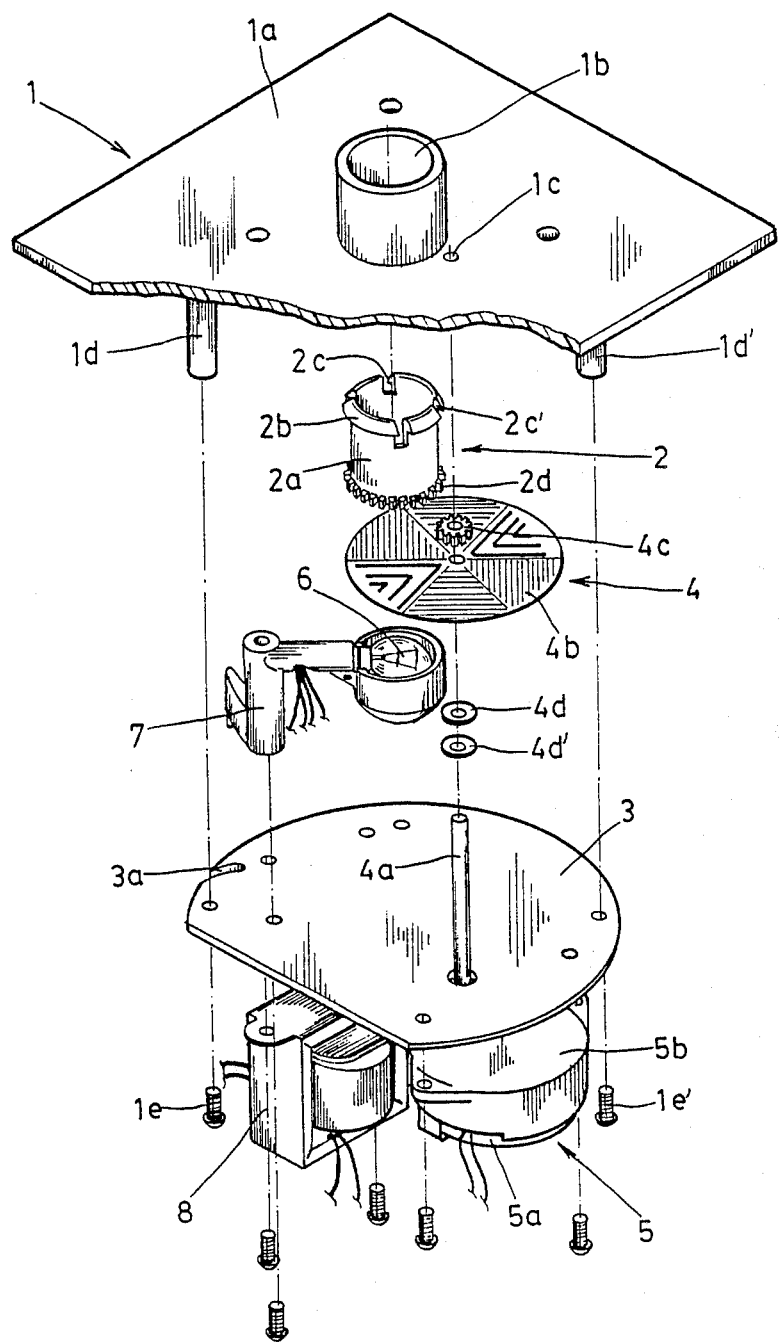
FIG. 4 is exploded view of the internal structure of an embodiment according to the present invention.

As shown in the attached drawings, an improved structure of optical fiber decorating lamp according to the present invention comprises the following:

A partition board (1) has a body (1a) with a cylindrical projection (1b) at its center for holding a bundle seat (2), a hole (1c) for holding a color filter shaft (4a), and a plurality of connecting posts (1d), (1d') beneath the body (1a). A bottom plate (3) is to be fastened with screws (1e), (1e') beneath the connecting post (1d), (1d'), a light shield (1f), see FIG. 3, beneath the board (1) to cover heat dissipation holes (10a) (FIG. 3) on a block (10). The aforesaid body (1a), a cylindrical projection (1b), hole (1c), connecting posts (1d), (1d') and the light shield (1f) can be made by a plastic injection forming process.

A bundle seat (2) has a body (2a), an end shaped like a gear (2d), and another end in the form of a wedge flange (2b), also a plurality of grooves (2c), (2c') in the body (2a) at the wedge flange (2b) to ease upward movement of the bundle seat (2) by allowing compressing of the wedge flange (2b) so that the bundle seat (2) can pass through the cylindrical projection (1b) and be moveably connected to the partition board (1). The body (2a), the wedge flange (2b), the grooves (2c), (2c') and the gear (2d) can also be made by a plastic injection forming process.

A bottom plate (3) is connected to the lower side of the connecting posts (1d), (1d') by means of the screws (1e), (1e') and has a positioning groove (3a) at its edge for positioning of a lamp socket (7).

Figure 5:
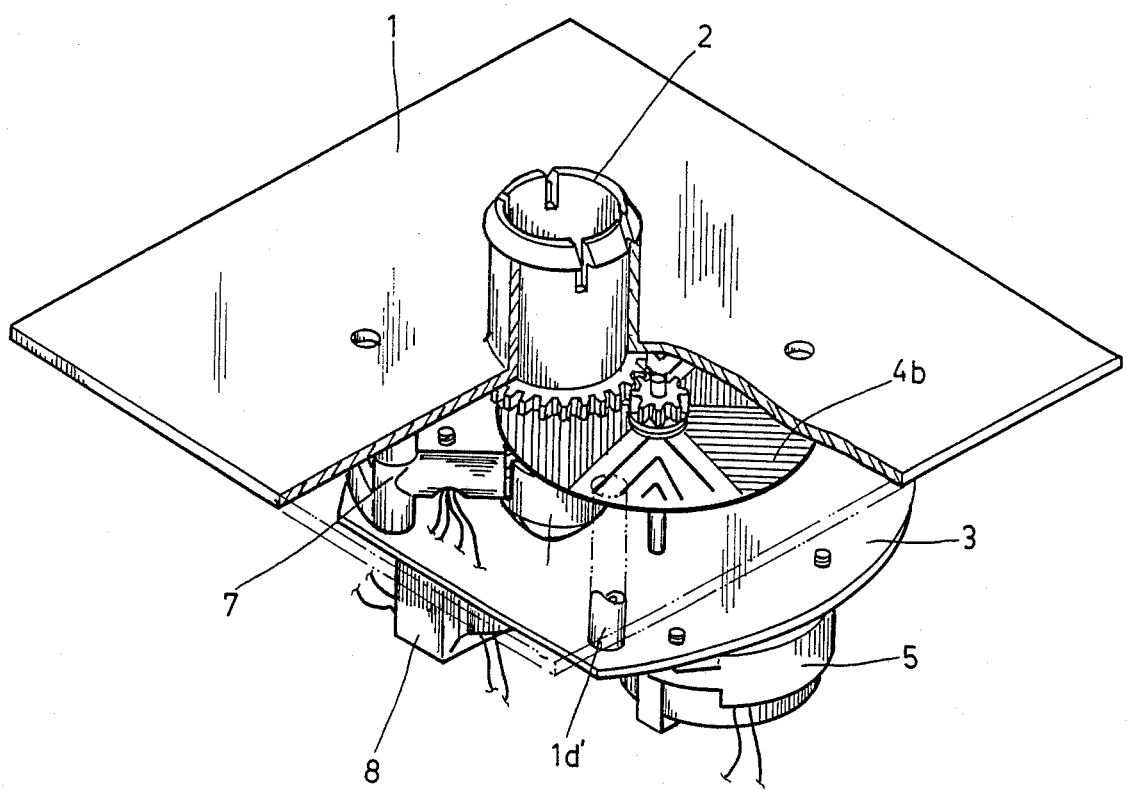
FIG. 5 is a partly diagrammatic sectional view of the assembly of the internal structure of an embodiment according to the present invention.

A rotatable color filter (4) is fixed between the partition board (1) and motor (5), see FIG. 5. The motor (5) comprises a shaft (4a), and at it can be connected a plurality of other parts such as the transparent plastic color disc (4b) with different colors, a pinion (4c), and packings (4d), (4d'). The transparent plastic color disc (4b) has patterns or stripes of different colors, located just beneath the bundle seat (2). The pinion (4c) is to drive the gear (2d) for rotating the bundle seat (2) as well as optical fibers (11) fixed to the bundle seat (2). One of the shaft (4a) is fixed in the hole (1c) of the partition board (1), and the other end is passing through the bottom plate (3) as driven by the motor (5).

The motor (5) with a reducing gear is fixed to the bottom plate (3) with an output shaft from the reducing gear (5b) coupled to the motor body (5a) to drive the color filter shaft (4a).

A bulb (6) is the light source of the present invention.

Figure 7:
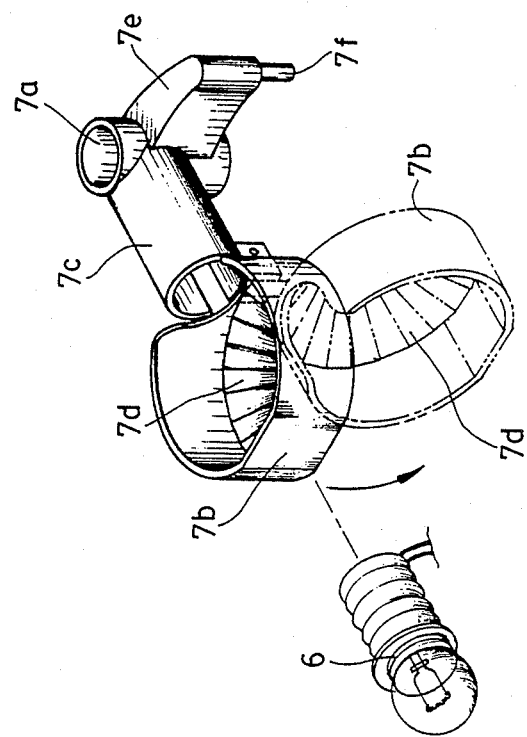
FIG. 7 is a perspective view of an embodiment of a lamp socket according to the present invention.
Figure 6:
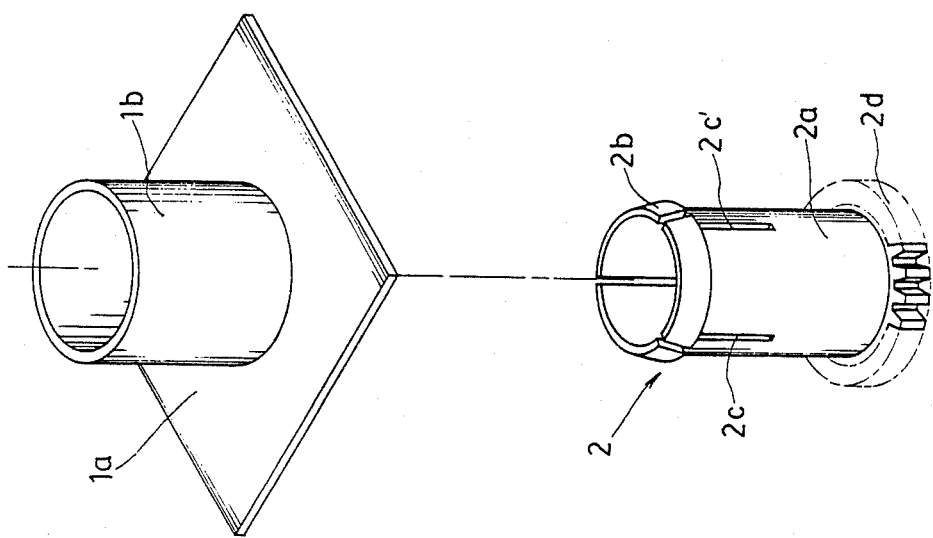
FIG. 6 is a schematic illustration of the assembly of the bundle seat according to the present invention.
Figure 8:
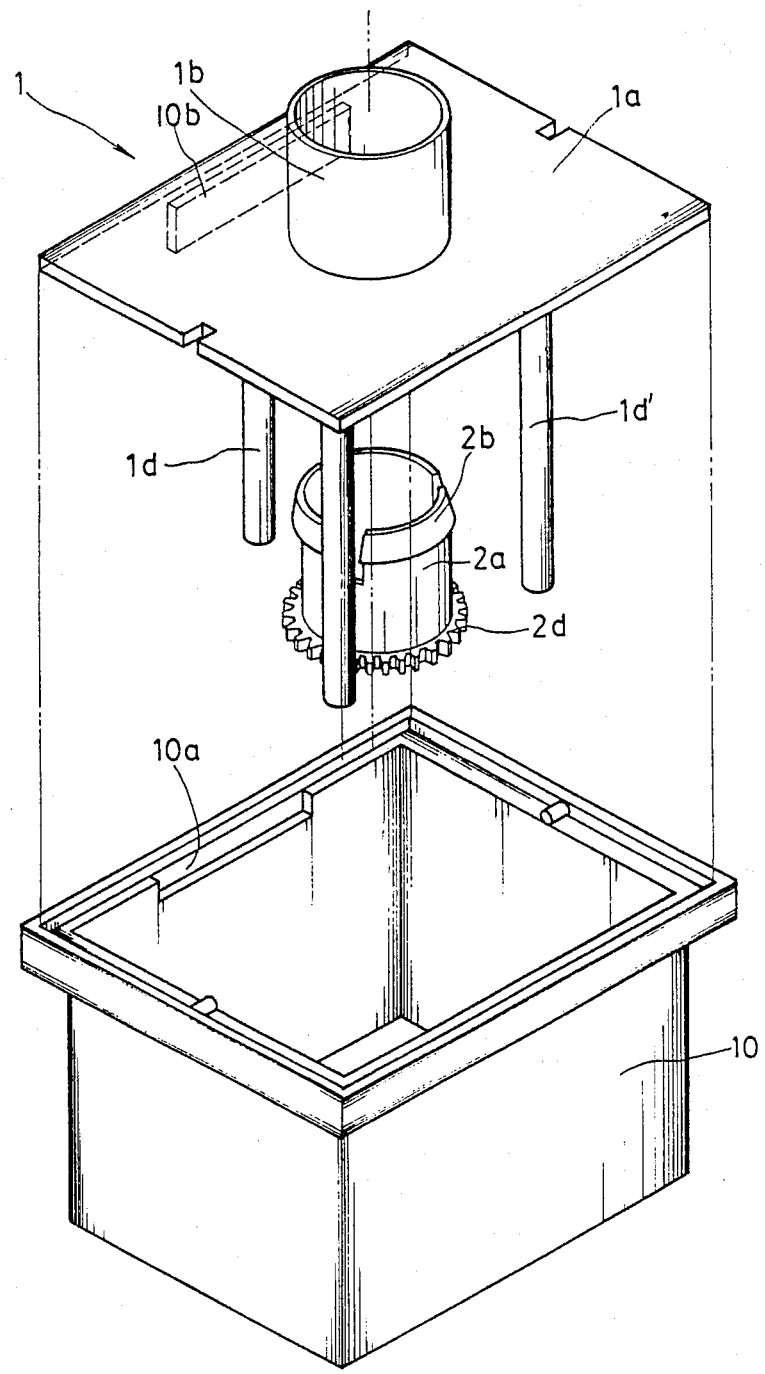
FIG. 8 is a schematic illustration of a partition board and a block according to the present invention.

The lamp socket (7) is located on the connecting post (1d), with a sleeve (7a), see FIG. 7, which, after installation on the connecting post (1d), allows rotation of the lamp socket (7) around the connecting post (1d). It has a socket (7b) which can be bent 90° to facilitate replacement of the bulb (6). A plurality of reflecting mirrors (7d) is arranged in the socket (7b). They are conically different degrees are fixed arranged, or otherwise, in the socket (7b) in order to enhance the sparkling effect of the optical fiber decorating lamp and to minimize heat energy emitting toward the optical fiber (11), and to prevent burning of the optical fiber (11). The sleeve (7a) has a hook or arm (7e) for rotating the lamp socket (7). The hook (7e) has a stop pin (7f) for positioning within the groove (3a) on the bottom plate (3), so as to fix the lamp socket (7) in its normal position.

A transformer (8) is also fixed on the bottom plate (3) as a power source for the present invention (FIG. 5).

The above components from the inner parts of the present invention. The invention further comprises a housing composed of a cover (9) and a block (10), and a bundle (11) of optical fibers fixed to the bundle seat (2) to form a novel and improved optical fiber decorating lamp.

For assembly of the present invention, the partition board (1) and all other components to be fixed to it, is first placed on the recessed rim (10b) on the block (10), an optical fiber bundle (11) in the form of flowers and leaves are fixed to the bundle seat (2), and then the cover (9) is installed to complete the assembly. The heat dissipation holes (10a) on the block (10) covered by the light shielf (1f).

I claim:

1. An optical fibre decorating lamp comprising:
   a partition board having a body with a cylindrical projection at its center for holding a respective bundle seat, a hole for holding a respective color filter shaft, a plurality of connecting posts beneath said body to connect a respective bottom plate with screws beneath said connecting posts, and a light shield beneath said body to cover heat dissipation holes on a respective base block;
   a bundle seat, said bundle seat having a body with a first, lower gear end and a second, upper end in the form of a wedge flange, a plurality of grooves extending in said body and said wedge flange to ease upward movement of said bundle seat when compressing said wedge flange so that said bundle seat can pass through said cylindrical projection in and be moveably connected to said partition board;
   a bottom plate connected to the lower ends of said connecting posts by means of screws and having a positioning groove at its edge for positioning purpose;
   a rotatable color filter fixed between said partition board and a respective motor;
   a motor operatively connectable to said bottom plate, said motor comprising a motor shaft for connecting to said motor a transparent plastic color disc with different colors, a pinion and associated packings, said color discs including transparent plastic films having patterns and stripes of different colors located just beneath said bundle seat, said pinion for driving said gear end for rotating said bundle seat and respective optical fibers fixed to said bundle seat, with one end of said motor shaft on which is mounted said color filter fixed to said partition board and the other end is passing through said bottom plate, and being adapted to be driven by said motor;
   a lamp socket pivotally and sleeved located on a respective connecting post, said lamp socket upon being installed on its connecting post can rotate around the connecting post, said lamp socket including a socket which can be bent through at least about 90° to facilitate replacement of the respective bulb, and including a plurality of reflecting mirrors arranged in different degrees in said socket to enhance sparkling effect of the optical fiber decorating lamp and to minimize heat energy emitting toward the optical fiber in order to preclude burning of the optical fiber;
   a sleeve which has a hook for rotating the lamp socket;
   a stop pin on the hook for positioning within said groove of said bottom plate and to fix the lamp socket at its normal position;
   a bulb as a light source of the present invention; and
   a transformer fixed on said bottom plate as a power source for said optical fiber decorating lamp.

2. The optical fiber decorating lamp according to claim 1 and further comprising a transparent cover and a base block with a long heat dissipation slot, wherein during assembly of said partition board as well as those parts to be located above said partition board these are first installed in a recess formation on said block in such a way that said light shield is just covering the heat dissipation slot of said base block and then optical fibers in the form of flowers and leaves are placed on said bundle seat and the transparent cover is installed to complete the assembly.

3. The optical fiber decorating lamp according to claim 1 wherein said partition board is in the form of a board which has a hollow cylindrical projection at the center, a hole, several connecting posts and a light shield, all made of plastic material by injection forming techniques.

4. The optical fiber decorating lamp according to claim 1 wherein said bundle seat body having an annular wedge flange, grooves and gear formation is made by plastic injection forming.

* * * * *